(12) United States Patent
Weller et al.

(10) Patent No.: US 10,788,098 B2
(45) Date of Patent: Sep. 29, 2020

(54) CLUTCH DISK COMPRISING A CENTRIFUGAL PENDULUM

(71) Applicant: SCHAEFFLER TECHNOLOGIES AG & CO. KG, Herzogenaurach (DE)

(72) Inventors: Uwe Weller, Karlsruhe (DE); Steffen Lehmann, Ettlingen (DE); Alain Rusch, Gambsheim (DE); Evgenij Franz, Rastatt (DE); Walter Hepperle, Offenburg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 321 days.

(21) Appl. No.: 15/754,152

(22) PCT Filed: Aug. 17, 2016

(86) PCT No.: PCT/DE2016/200383
§ 371 (c)(1),
(2) Date: Feb. 21, 2018

(87) PCT Pub. No.: WO2017/032370
PCT Pub. Date: Mar. 2, 2017

(65) Prior Publication Data
US 2018/0245664 A1 Aug. 30, 2018

(30) Foreign Application Priority Data
Aug. 27, 2015 (DE) .................. 10 2015 216 356

(51) Int. Cl.
*F16F 15/134* (2006.01)
*F16F 15/14* (2006.01)
(Continued)

(52) U.S. Cl.
CPC ........ *F16F 15/13492* (2013.01); *F16D 13/64* (2013.01); *F16F 15/1343* (2013.01);
(Continued)

(58) Field of Classification Search
CPC ........... F16F 15/13492; F16F 15/13484; F16F 15/1343; F16F 15/13461; F16F 15/145;
(Continued)

(56) References Cited

U.S. PATENT DOCUMENTS

| 5,000,304 A | 3/1991 | Kock et al. |
| 9,316,044 B2 | 4/2016 | Hemphill |

(Continued)

FOREIGN PATENT DOCUMENTS

| DE | 10 2008 039 630 A1 | 3/2009 |
| DE | 102008039630 A1 | 3/2009 |

(Continued)

OTHER PUBLICATIONS

International Search Report for International Application No. PCT/DE2016/200383 dated Nov. 25, 2016.

*Primary Examiner* — Greg Binda
(74) *Attorney, Agent, or Firm* — Brooks Kushman P.C.

(57) ABSTRACT

The invention relates to clutch disc comprising a torsional vibration damper which has an inlet part and an outlet part and a spring device operatively arranged in the peripheral direction between the input part and the output part, wherein the spring device is formed from the first and second spring elements connected behind one another and separated by an intermediate flange, and a centrifugal pendulum which has a pendulum mass carrier arranged about an axis of rotation of the clutch disc and pendulum masses accommodated on same on pendulum paths for oscillation and arranged in a distributed manner over the periphery. In order to improve the insulation effect of the torsional vibration damper and the centrifugal pendulum and/or better adjust same to the required application, the pendulum mass carrier is coupled for conjoint rotation with the intermediate flange and centrally accommodated on the output part.

13 Claims, 5 Drawing Sheets

(51) Int. Cl.
*F16D 13/64* (2006.01)
*F16H 45/02* (2006.01)

(52) U.S. Cl.
CPC .. *F16F 15/13461* (2013.01); *F16F 15/13484* (2013.01); *F16F 15/145* (2013.01); *F16D 2300/22* (2013.01); *F16H 45/02* (2013.01); *F16H 2045/0226* (2013.01); *F16H 2045/0263* (2013.01)

(58) Field of Classification Search
CPC .......................... F16F 15/13128; F16D 13/64; F16D 2300/22; F16H 2045/0263; F16H 2045/0226; F16H 45/02
USPC ....................................................... 464/68.2
See application file for complete search history.

(56) References Cited

U.S. PATENT DOCUMENTS 9,638,282 B2 * 5/2017 Kawazoe .......... F16F 15/13484
2010/0269497 A1 10/2010 Engelmann et al.

FOREIGN PATENT DOCUMENTS

| DE | 102011086532 A1 | 6/2012 |
| DE | 102013200143 A1 | 8/2013 |
| DE | 10 2014 219 271 A1 | 3/2016 |
| DE | 102014219271 A1 | 3/2016 |
| EP | 2706262 A2 | 3/2014 |
| FR | 3011605 A1 | 4/2015 |
| WO | 2014122367 A1 | 8/2014 |
| WO | 2015/149771 A1 | 10/2015 |

* cited by examiner

US 10,788,098 B2

CLUTCH DISK COMPRISING A CENTRIFUGAL PENDULUM

CROSS-REFERENCE TO RELATED APPLICATIONS

This application is the U.S. National Phase of PCT/DE2016/200383 filed Aug. 17, 2016, which claims priority to DE 102015216356.3 filed Aug. 27, 2015, the entire disclosures of which are incorporated by reference herein.

TECHNICAL FIELD

This disclosure relates to a clutch disk having a torsional vibration damper having an input portion and an output portion and a resilient device which is effectively arranged in a circumferential direction between the input portion and the output portion, wherein the resilient device is formed by first and second resilient elements which are connected one behind the other and which are separated by an intermediate flange, and having a centrifugal pendulum having a pendulum mass carrier which is arranged around a rotation axis of the clutch disk and pendulum masses which are received in a manner capable of oscillating on pendulum paths and which are arranged so as to be distributed over the circumference.

BACKGROUND

Clutch disks having a torsional vibration damper having first and second resilient elements which are arranged between an input portion and an output portion and which are connected in series with an intermediate flange being interposed are known, for example, from DE 10 2008 039 630 A1.

As shown in FIG. 5, German patent No. 10 2014 219 271.4 further discloses a clutch disk in which a pendulum flange having pendulum masses of a centrifugal pendulum, which are arranged so as to be able to oscillate at both sides and so as to be distributed over the periphery, is connected to the output portion of a torsional vibration damper. In this instance, a main damper having first resilient elements and a no-load damper having second resilient elements are connected in series. The flange portions which act on the resilient elements are in this case separately connected to a hub in a rotationally engaging manner.

As shown in FIG. 6, PCT publication no. WO 2015/149771, which claims priority to German patent application No. 10 2014 206 154.7, further discloses a clutch disk having a centrifugal pendulum which is arranged in a rotationally secure manner on a hub of the clutch disk and which has a pendulum mass carrier which is formed from two lateral portions and between which pendulum masses are received in a manner able to oscillate and so as to be axially distributed over the periphery and are resiliently supported radially by means of a radial spring suspension.

SUMMARY

An object of this disclosure is to advantageously develop a clutch disk having a torsional vibration damper and a centrifugal pendulum. In particular, the vibration insulation of the clutch disk is intended to be improved with respect to torsional vibrations. In particular, the adaptation of the clutch disk to predetermined applications is intended to be improved.

The object is achieved by the claims and the embodiments described herein.

The clutch disk of this disclosure may be provided for use in a friction clutch. The friction clutch can be used as a separating clutch of the drive train between an internal combustion engine and a gear mechanism. The friction clutch can be used in hybrid drive trains, in drive trains with manually operated or automatically operated gear mechanisms. According to this disclosure a friction clutch having the proposed clutch disk, a torque transmission device having a flywheel, in particular a two-mass flywheel, a friction clutch and the proposed clutch disk is expressly included in particular as a structural unit. In particular, in a torque transmission device a damping concept having the proposed clutch disk can be provided, wherein the friction clutch, at least one torsional vibration damper and at least one centrifugal pendulum are provided between a primary centrifugal mass and a secondary centrifugal mass, wherein a torsional vibration damper and a centrifugal pendulum are arranged in the proposed manner in the clutch disk.

The clutch disk may be arranged for rotation about a rotation axis, for example, the rotation axis of the friction clutch, and may contain a rotational vibration damper, such as a torsional vibration damper having an input portion and an output portion. A resilient device is effectively arranged in the circumferential direction between the input portion and the output portion. The input portion may receive in a radially outer manner friction linings for forming a frictional engagement with corresponding friction counter-faces of a friction clutch, and therefore acts as a lining carrier. The input portion can be formed from a single lining carrier which is formed as a flange portion. The input portion can be formed from two axially spaced-apart flange portions which are connected to each other, for example, by means of spacer bolts, wherein one of the flange portions is constructed as a lining carrier. The input portion acts on the resilient device at the input side. The output portion can be formed from a hub, which is connected in a rotationally engaging manner to a shaft, for example, a gear mechanism input shaft, and at least one flange portion which is connected to the hub with or without circumferential backlash. In the case of a provided circumferential backlash, an additional resilient device can be effectively arranged as a no-load damper between at least one flange portion and the hub over the rotation angle of the circumferential backlash. The at least one output-side flange portion can be arranged axially beside an individual input-side flange portion, such as a lining carrier. In the case of two axially spaced-apart input-side flange portions, one or more output-side flange portions can be arranged axially between the two input-side flange portions. The at least one flange portion acts on the resilient device at the output side so that the resilient elements of the resilient device are compressed against each other in the case of a rotation of the input portion and the output portion and take up energy and discharge it again in the case of a backward rotation. A friction device can be effectively provided over at least a portion of a relative rotation between the input portion and the output portion.

The resilient device is formed by at least two resilient elements which are connected one behind the other, wherein an intermediate flange is arranged between two resilient elements. In this instance, the first resilient elements can be acted on by the output portion and the intermediate flange and the second resilient elements can be acted on by the intermediate flange and the output portion. The intermediate flange can be arranged axially between two output-side flange portions or in the case of a single output-side flange portion axially adjacent thereto.

According to an embodiment, the first and second resilient elements are arranged between two output-side flange portions with the intermediate store being interposed. The output-side flange portions are received on the hub with circumferential backlash. Depending on the torque direction—tensile loading or thrust loading—the input portion acts on one of the two output-side flange portions, wherein it lifts off from the tooth arrangement formed with circumferential backlash between the flange portions and the hub in a circumferential direction, while the other flange portion transmits the torque which is transmitted via the resilient device via the tooth arrangement to the hub.

The resilient elements can be formed by helical pressure springs, plate spring assemblies, elastomer blocks and/or the like which are arranged over the circumference. A plurality of helical pressure springs can be nested radially one in the other and therefore form a resilient element. Helical pressure springs which are nested one in the other can be constructed to be of different lengths in order to form a multiple-stage resilient characteristic line of the resilient force of a resilient element against the rotational angle of the input portion and output portion. Alternatively or additionally, application devices of the input portion, the output portion and/or the intermediate flange for acting on helical pressure springs which are nested radially one in the other can be arranged at different circumferences so that one portion of the helical pressure springs is acted on at smaller rotational angles than the other portion of the helical pressure springs which are nested one in the other. The first and second resilient elements or the helical pressure springs which belong thereto can have the same or different rigidities. A different configuration of the rigidities of the first and second resilient elements may be particularly advantageous in the case of different requirements being placed on the clutch disk in a tension and thrust direction.

The centrifugal pendulum may have a pendulum mass carrier which is arranged around a rotation axis of the clutch disk. Pendulum masses which are arranged so as to be distributed over the circumference are received on the pendulum mass carrier so as to be able to oscillate on pendulum paths. The pendulum mass carrier can be constructed as a pendulum flange, on which pendulum masses are received at both sides, wherein axially opposite pendulum masses are connected to each other to form pendulum mass units by way of connections which engage through the pendulum flange. Alternatively, the pendulum mass carrier may be formed by two lateral portions which are arranged axially beside each other and which may be connected to each other and which have an axially extended pendulum portion, in which the pendulum masses are received in a manner able to oscillate. The proposed clutch disk has a centrifugal pendulum, whose pendulum mass carrier is connected to the intermediate flange in a rotationally secure manner. In order to center the pendulum mass carrier and the intermediate flange which is connected thereto, the pendulum mass carrier is received on the output portion in a centered manner. In this case, the intermediate flange is advantageously damped with the low mass moment of inertia thereof.

According to an embodiment of the clutch disk, there is provided on the hub of the output portion an axial region, such as a projection, on which the pendulum mass carrier is received so as to be able to rotate in a limited manner and to be centered.

A friction sleeve can be arranged between the pendulum mass carrier and the output portion, for example, the hub thereof. The friction sleeve can be arranged on the pendulum mass carrier or on the hub in a rotationally secure manner and can form a friction device with a friction counter-face which can be rotated relative thereto. Alternatively to the friction sleeve, there may be provided a sliding sleeve which reduces the friction between the pendulum mass carrier and the output portion. Alternatively, a roller or sliding bearing can be provided between the pendulum mass carrier and the output portion.

According to an embodiment of the clutch disk, the torsional vibration damper and the centrifugal pendulum can be arranged axially beside each other. In an alternative embodiment, the torsional vibration damper and the centrifugal pendulum can be constructed so as to be nested one in the other. For example, the intermediate flange may be constructed as a pendulum mass carrier. In this case, the pendulum masses of the centrifugal pendulum can be arranged radially outside or radially inside the resilient elements of the torsional vibration damper. Alternatively, the pendulum masses can be arranged to be axially adjacent to the resilient elements at substantially the same diameter.

In the case of the torsional vibration damper and the centrifugal pendulum being constructed so as to be axially beside each other, the pendulum mass carrier can be connected to the intermediate flange by means of axially orientated spacer bolts which engage through the input portion, in particular a flange portion of the lining carrier, in particular the lining carrier. The engagement of the spacer bolts is brought about at recesses, such as, for example, bent elongate holes of the input portion, in order to allow relative rotation between the intermediate flange and the input portion. In this case, a stop of the spacer bolts at circumferentially limiting walls of the recesses can limit a rotation angle between the input portion and the output portion.

In order to prevent a displacement of the pendulum masses which are radially located above the rotation axis radially inwardly in particular in the case of a clutch disk which is stationary or a clutch disk which is rotating at a low speed, the pendulum masses can be supported with respect to the pendulum mass carrier by means of radially active resilient elements, for example, helical pressure springs.

Unlike the centrifugal pendulum disclosed in German patent application No. 10 2014 206 254.7, which is hereby incorporated in this application in its entirety, the centrifugal pendulum of this disclosure is rotatable and centered on the hub of the output portion and not connected thereto in a rotationally secure manner. In this regard, the centrifugal pendulum is associated with the intermediate flange and not the output portion.

BRIEF DESCRIPTION OF THE DRAWINGS

The clutch disk is explained in greater detail with reference to the embodiment which is illustrated in FIGS. 1 to 4, in which.

DETAILED DESCRIPTION OF THE DRAWINGS

Figure 1:
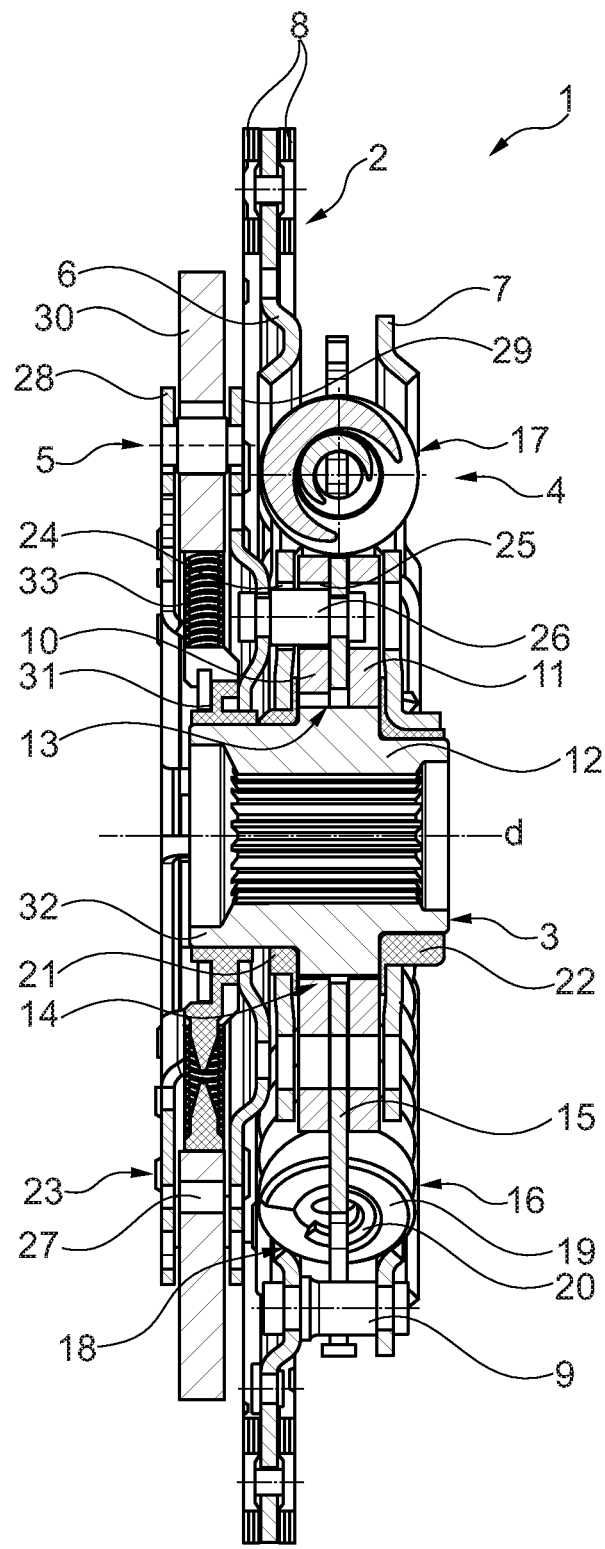
FIG. 1 is a cross-section through an embodiment of the proposed clutch disk.

FIG. 1 is a cross-section of the clutch disk 1 which is arranged around the rotation axis d and which has the input portion 2 and the output portion 3 and the torsional vibration damper 4 which is arranged therebetween and the centrifugal pendulum 5.

The input portion 2 is formed by the two axially spaced-apart flange portions 6, 7. In this case, the flange portion 6 acts as a lining carrier and receives radially outwardly the friction linings 8. The flange portions 6, 7 are securely connected to each other via the spacer bolts 9.

The output portion 3 is formed by the two flange portions 10, 11 which are connected to the hub 12 via the tooth arrangement 13 so as to form a circumferential backlash 14. The intermediate flange 15 is arranged so as to float axially between the two flange portions 10, 11.

The resilient device 16 is formed by the first resilient elements 17 and the second resilient elements 18 which are received between one of the flange portions 10, 11 and the intermediate flange 15 and which are acted on thereby in a circumferential direction. In the embodiment illustrated here, the resilient elements 17, 18 are formed by the helical pressure springs 19, 20 which are nested one in the other.

The output-side flange portions 10, 11 are acted on alternately in accordance with the torque which is introduced into the input portion 2 or the output portion 3 and transmit the applied torque via the resilient device 16 with the intermediate flange 15 to the output portion 3 or the input portion 2. In the tensile phase, the torque is transmitted via the friction linings 8 to the input portion 2. The spacer bolts 9 of the input portion 2 strike one of the flange portions 10, 11 so that it acts on the resilient device 16. The torque is transmitted to the other output-side flange portion 11, 10, which strikes the tooth arrangement 13 and which transmits the torque to the hub 12, via the resilient elements 17, 18 and the intermediate flange 15. In the thrust phase, the torque is conversely transmitted from the hub 12 to the friction linings 8 by one of the flange portions 11, 10 transmitting, by striking the tooth arrangement 13, the torque to the resilient elements 17, 18 and the intermediate flange 15 to the other flange portion 10, 11 which strikes the spacer bolts 9 so that torque is thereby transmitted to the flange portions 6, 7 and finally to the friction linings 8.

The flange portions 6, 7 are centered on the hub 12 with plastics bushes 21, 22 being interposed. The intermediate flange 15 is arranged in a floating manner with respect to the hub 12. The intermediate flange 15 is securely connected to the pendulum mass carrier 23 via the spacer bolts 26 which engage axially through the recesses 24, 25 of the flange portion 10 and the flange portion 6. The recesses 24, 25 are constructed in such a manner that an undisrupted rotation of the intermediate flange 15 with respect to the flange portions 6, 10 is made possible.

The pendulum mass carrier 23 is formed by the two lateral portions 28, 29 which are connected to each other with axial spacing by means of the spacer bolts 27. The lateral portions 28, 29 take up between them the pendulum masses 30 which are arranged so as to be distributed over the circumference and which in a manner known per se are received by means of pendulum bearings with respect to the pendulum mass carrier 23 in the centrifugal field so as to be able to oscillate so as to form a torsional vibration damper which adapts to speed. The friction sleeve 31 which is produced, for example, from plastics material and by means of which the pendulum mass carrier 23 is received on the axial projection 32 of the hub 12 so as to be centered and rotatable in a limited manner is received on the inner periphery of the lateral portions 28, 29. The intermediate flange 15 which is otherwise received in a floating manner is also centered on the hub 12 by means of the spacer bolts 26.

The pendulum masses 30 are accelerated in a radially outward direction in the case of adequate centrifugal force and supported via the pendulum bearings thereof on the lateral portions 28, 29 so as to be capable of oscillation. If the centrifugal force decreases as a result of low speeds of the clutch disk 1, or if it is zero in the case of a stationary clutch disk 1, the pendulum masses 30 located radially over the rotation axis d are supported in a radially inward direction. To this end, the pendulum masses 30 are supported in a radially inward direction by means of the radially effective resilient elements 33, such as helical pressure springs.

The centrifugal pendulum 5 is received with insulation from oscillations between the resilient elements 17, 18 so that the relevant mass moment of inertia is formed, apart from the pendulum masses 30, only by the pendulum mass carrier 23, the spacer bolts 26, 27 and the intermediate flange 15.

Figure 2:
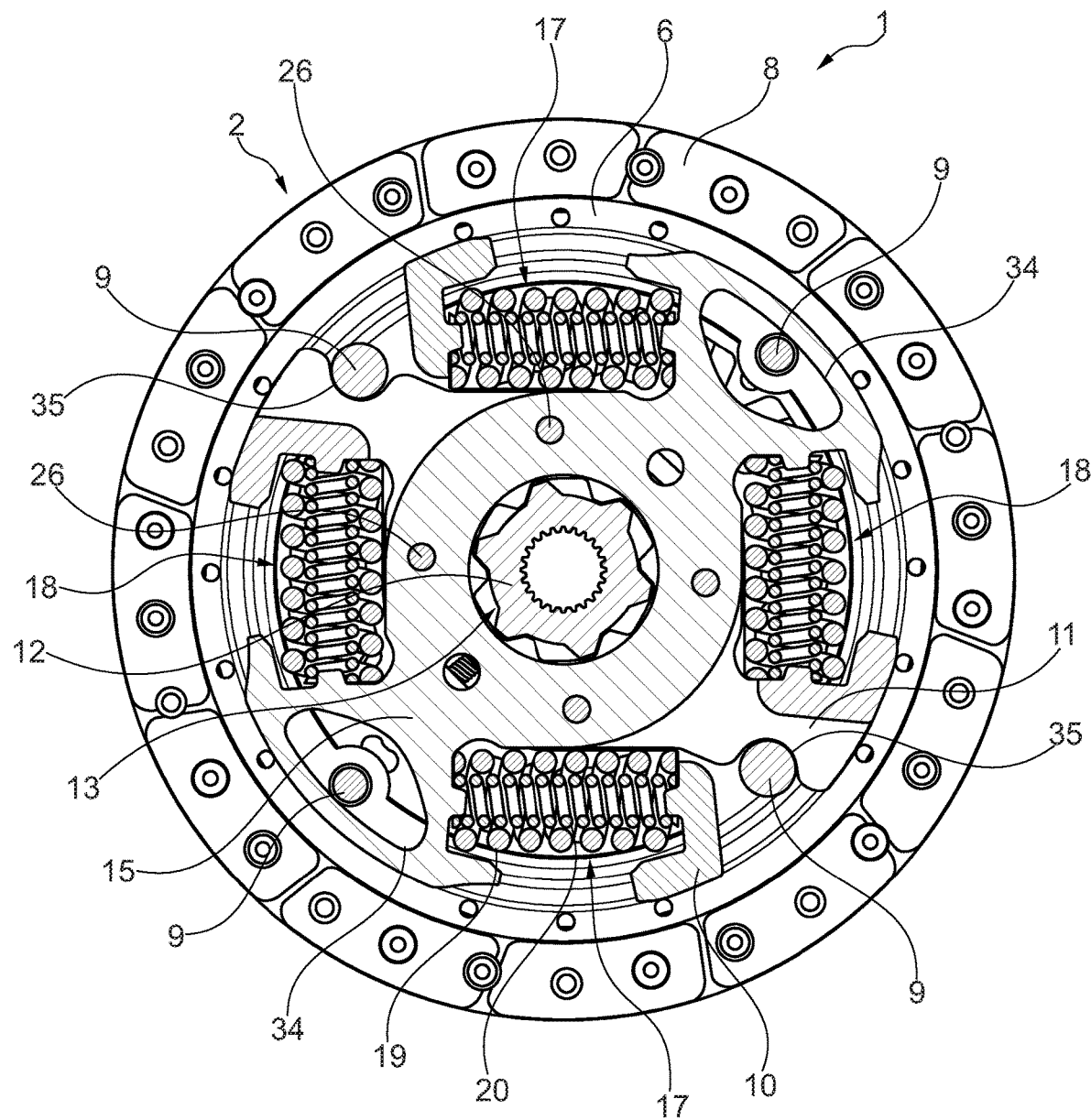
FIG. 2 is a front view of the clutch disk of FIG. 1 with some components removed or hidden for clarity.

FIG. 2 is a cross-section of the clutch disk 1 of FIG. 1. Of the input portion 2, only the flange portion 6 with the friction linings 8 and the spacer bolts 9 are illustrated. The spacer bolts 9 partially engage through the recesses 34 of the intermediate flange 15 with circumferential play and each form stops 35 for the output-side flange portions 10, 11 in a torque direction, in the illustrated operating position for the flange portion 11. There are received between the flange portion 10 and the intermediate flange 15 and the flange portion 11 and the intermediate flange 15 two diametrically opposed resilient elements 17, 18 which are formed by the helical pressure springs 19, 20, for example, in a slightly pretensioned state. The flange portions 10, 11 are received on the hub 12 in a rotationally engaging manner via the tooth arrangement 13 with circumferential backlash. The intermediate flange 15 is securely connected by means of the spacer bolts 26 to the pendulum mass carrier (not visible) 23 of the centrifugal pendulum 5 (FIG. 1).

Figure 3:
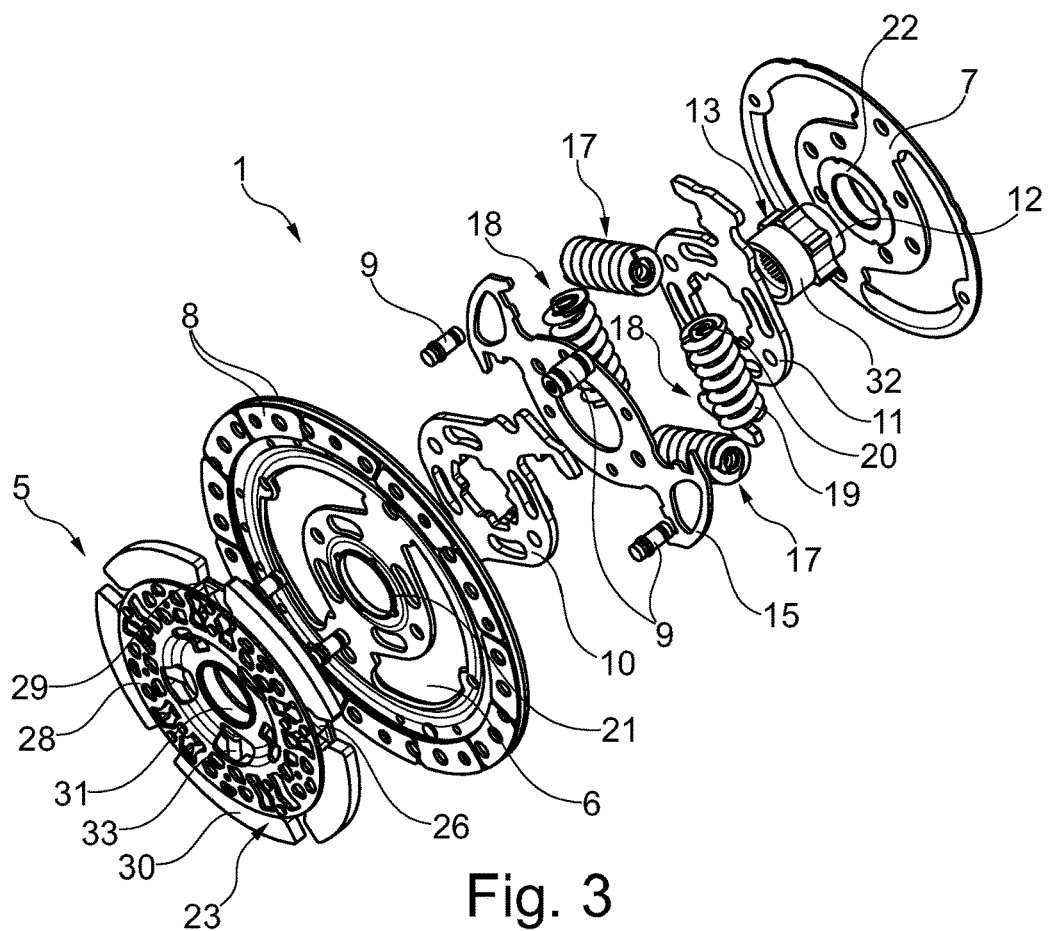
FIG. 3 is an exploded view of the clutch disk of FIGS. 1 and 2.

FIG. 3 is an exploded view of the clutch disk 1 having the centrifugal pendulum 5. The centrifugal pendulum 5 is formed by the pendulum mass carrier 23 and the pendulum masses 30. The pendulum mass carrier 23 is formed by the two lateral portions 28, 29 which are connected to each other by means of the spacer bolts 26 with axial spacing. The pendulum masses 30 are supported in a radially inward direction by means of the resilient elements 33. The pendulum mass carrier 23 is received in a centered manner on the axial projection 32 of the hub 12 by means of the friction sleeve 31 which is received on the lateral portions 28, 29. The centrifugal pendulum 5 is securely connected to the intermediate flange 15 by means of the spacer bolts 26. The output-side flange portions 10, 11 flank the intermediate flange 15 and are received with circumferential backlash on the tooth arrangement 13 of the hub 12. The resilient elements 17, 18 are each received so as to be able to be tensioned between one of the two flange portions 10, 11 and the intermediate flange 15 and formed by the helical pressure springs 19, 20. The flange portion 6 with the friction linings 8 and the flange portion 7 are connected to each other by means of the spacer bolts 9 and centered on the hub 12 by means of the plastics bushes 21, 22.

Figure 4:
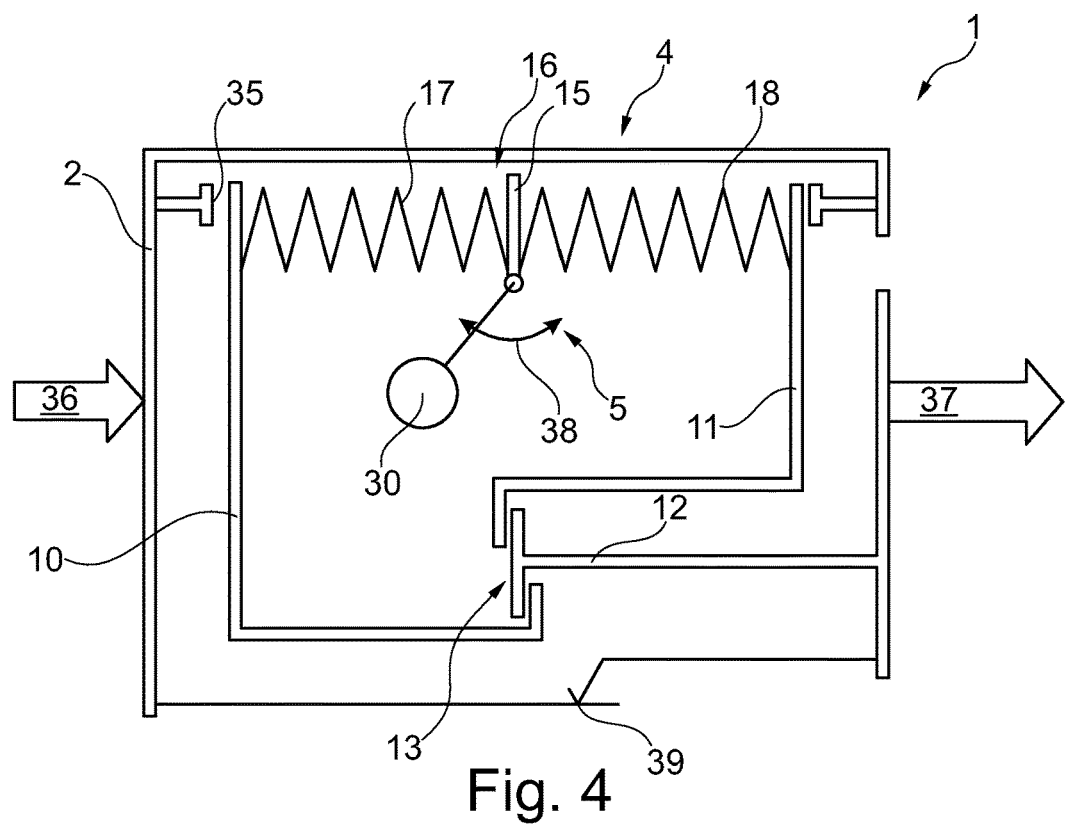
FIG. 4 is a schematic circuit diagram of the proposed clutch disk.
Figure 5:
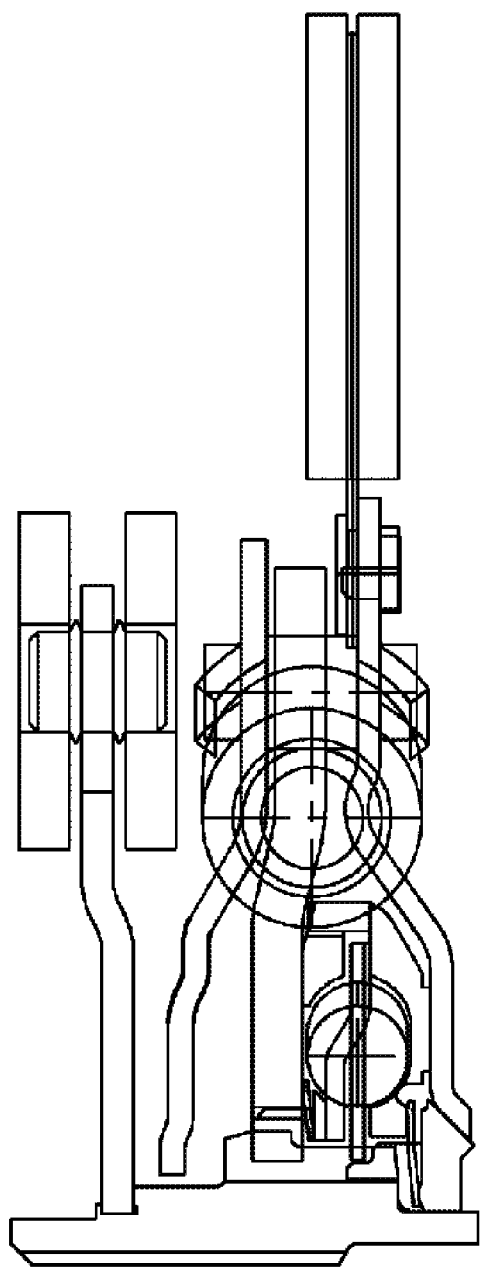
FIG. 5 is a cross-sectional view of a prior art clutch disk showing a pendulum flange having pendulum masses arranged at both sides.
Figure 6:
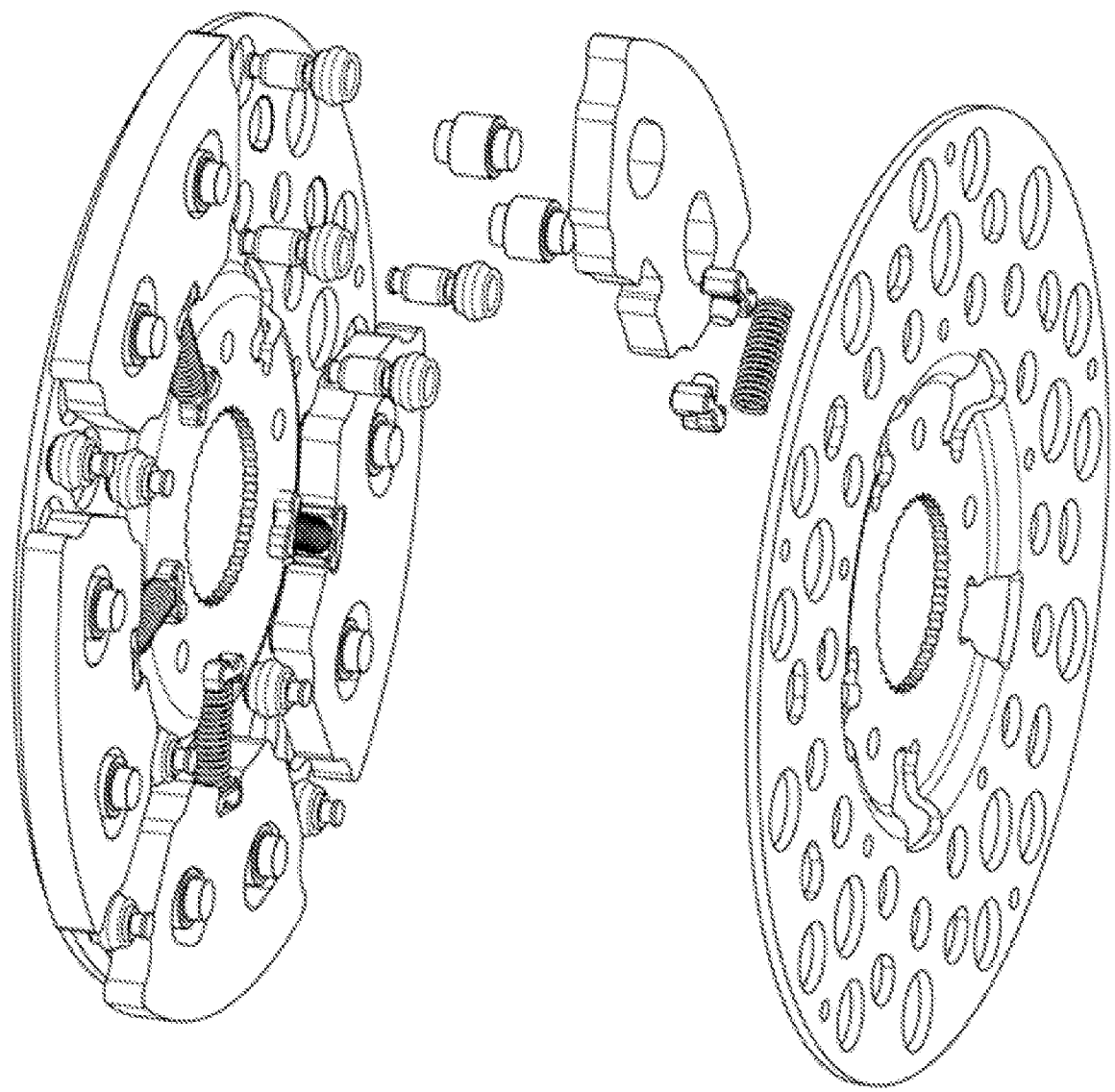
FIG. 6 is an exploded perspective view of a prior art pendulum showing pendulum masses supported via radially effective resilient elements with respect to a pendulum mass carrier.

FIG. 4 is a schematic circuit diagram of the clutch disk 1 of FIGS. 1 to 3. In a tensile phase of the clutch disk 1, the torque which is introduced into the clutch disk 1 in the direction of the arrow 36 via the friction clutch and the friction linings is transmitted from the input portion 2 via the stop 35 to the flange portion 10. This flange portion lifts off from the tooth arrangement 13 of the hub 12 and acts on the resilient device 16 with the resilient elements 17, the intermediate flange 15 and the resilient elements 18. The rigidities of the resilient elements 17, 18 can be identical or different. The characteristic lines of the resilient elements 17, 18 may have one step or multiple steps. The torque is transmitted to the flange portion 11. This flange portion moves into positive-locking connection with the hub 12 at the tooth arrangement 13 so that in the direction of the arrow 37 the torque which is insulated from oscillations by the torsional vibration damper 4 and the centrifugal pendulum 5 is transmitted to a gear input shaft. The centrifugal pendulum 5 with the pendulum masses 30 which oscillate in a plane perpendicular to the rotation axis of the clutch disk 1 in accordance with the double-headed arrow 38 has a low mass moment of inertia or an advantageous mass ratio of the pendulum masses 30 with respect to the non-oscillating masses as a result of the low mass of the pendulum mass carrier thereof and the intermediate flange 15. There is provided between the input portion 2 and the hub 12 the friction device 39 which, for example, may be formed a friction sleeve which is arranged between the pendulum carrier and the hub 12. In a thrust direction counter to the arrows 36, 37, the hub 12 carries the flange portion 11 with the resilient device 16 being loaded. The torque which is directed via the resilient device 16 is transmitted to the input portion 2 by means of the flange portion 10 via the stop 35.

LIST OF REFERENCE NUMERALS

1 Clutch disk
2 Input portion
3 Output portion
4 Torsional vibration damper
5 Centrifugal pendulum
6 Flange portion
7 Flange portion
8 Friction lining
9 Spacer bolts
10 Flange portion
11 Flange portion
12 Hub
13 Tooth arrangement
14 Circumferential backlash
15 Intermediate flange
16 Resilient device
17 Resilient element
18 Resilient element
19 Helical pressure spring
20 Helical pressure spring
21 Plastics bush
22 Plastics bush
23 Pendulum mass carrier
24 Recess
25 Recess
26 Spacer bolt
27 Spacer bolt
28 Lateral portion
29 Lateral portion
30 Pendulum mass
31 Friction sleeve
32 Projection
33 Resilient element
34 Recess
35 Stop
36 Arrow
37 Arrow
38 Double-headed arrow
39 Friction device
d Rotation axis

The invention claimed is:

1. A clutch disk comprising:
a rotation axis;
a torsional vibration damper comprising:
an input portion; and
an output portion comprising a hub;
a first output-side flange portion arranged with backlash on the hub;
a second output-side flange portion arranged with backlash on the hub; and
a resilient device, comprising:
an intermediate flange;
a first resilient element arranged to apply a first rotational force to the intermediate flange in a first rotational direction and arranged to apply a second rotational force to the first output-side flange portion in a second rotational direction, opposite the first rotational direction; and
a second resilient elements arranged to apply a third rotational force to the intermediate flange in the second rotational direction, and arranged to apply a fourth rotational force to the second output-side flange portion in the first rotational direction; and
a centrifugal pendulum comprising:
a pendulum mass carrier arranged around the rotation axis and rotationally fixed to the intermediate flange; and
pendulum masses capable of oscillating relative to the pendulum mass carrier.

2. The clutch disk as claimed in claim 1, wherein the pendulum mass carrier is received on the hub so as to be rotatable in a limited manner and centered thereon.

3. The clutch disk as claimed in claim 1, wherein a friction sleeve is arranged between the pendulum mass carrier and the hub.

4. The clutch disk as claimed in claim 1, wherein the torsional vibration damper and the centrifugal pendulum are arranged axially beside each other.

5. The clutch disk as claimed in claim 1, wherein the pendulum mass carrier is connected to the intermediate flange via axially orientated spacer bolts which engage through a flange portion of the input portion which receives friction linings.

6. The clutch disk as claimed in claim 1, wherein the pendulum mass carrier is constructed as a pendulum flange having pendulum masses arranged at both sides.

7. The clutch disk as claimed in claim 1, wherein the pendulum mass carrier is formed by two lateral portions which are arranged axially beside each other and which are axially spaced apart at a pendulum portion and which receive the pendulum masses between them.

8. The clutch disk as claimed in claim 1, wherein the pendulum masses are supported via radially effective resilient elements with respect to the pendulum mass carrier.

9. The clutch disk as claimed in claim 1, wherein the first and second resilient elements have the same rigidity.

10. The clutch disk of claim 1, wherein the input portion includes two axially spaced-apart flange portions secured to one another.

11. The clutch disk of claim 10, wherein the two axially spaced-apart flange portions are connected via spacer bolts extending through apertures in the intermediate flange.

12. The clutch disk of claim 1, wherein the hub extends along the rotation axis and the first output-side flange portion and the second output-side flange portion are spaced apart from one another and attached to the hub via a tooth arrangement.

13. The clutch disk of claim 12, wherein the pendulum mass carrier is rotatably connected to the hub.

* * * * *